2,715,625

METHOD OF PREPARING 4-AMINO URACILS

Charles E. Maxwell III, Uncasville, Conn., and Charles J. Salivar, Malverne, N. Y., assignors to Chas. Pfizer & Co., Inc., Brooklyn, N. Y., a corporation of Delaware No Drawing. Application January 30, 1952, Serial No. 269,108

7 Claims. (Cl. 260—256.4)

This invention relates to an improved method of making certain intermediates for xanthine and methylated xanthines and, in particular, to the preparation of intermediates for caffeine and theophylline.

It has been known for some time that urea or its methylated derivatives, N-methylurea and N,N'-dimethylurea, may be condensed with cyanoacetic acid to form a cyanoacetylurea compound, i. e. cyanoacetylurea per se or the corresponding methylated cyanoacetylurea. This reaction is generally carried out in the presence of acetic anhydride, which acts as a dehydrating agent and solvent. Cyanoacetyldimethylurea is an especially useful intermediate in the synthesis of caffeine by the Traube process (Ber. vol. 33, p. 3035) or its variations. This type of process, however, has several disadvantages. The reactants must usually be heated to induce reaction, and only moderate yields of the cyanoacetylurea compound are obtained.

It has now been found that the presence of a minor or small proportion of a basic material in the reaction mixture serves to catalyze the condensation of urea or a methylated urea with cyanoacetic acid and unexpectedly results in a marked improvement in the yield of the desired cyanoacetylurea compound. The addition of an alkaline-reacting compound to the condensation also raises naturally the temperature of the reaction mass, thus simultaneously obviating the second major difficulty previously encountered with these reactions.

A variety of inorganic and organic basic materials may be used as condensation catalysts, including tertiary amines like triethylamine; cyclic organic bases, such as pyridine; salts of weak acids with strong bases, such as potassium acetate and sodium acetate; and oxides of alkaline earth metals like calcium oxide and barium oxide. Many related materials are also operable, as well as mixtures thereof. For instance, rather than triethylamine, one may employ tributylamine, diethylaniline, and so forth. Various cyclic nitrogen compounds may be used in place of pyridine, e. g. piperidine, quinoline, alkylated pyridines. Other examples of useful inorganic salts are those of alkali metal or alkaline earth metal hydroxides with weak acids, in particular acetic acid. Thus, in addition to potassium acetate and sodium acetate listed above, lithium acetate may be chosen. The most important criteria are that the catalyst be alkaline in nature, that it not itself preferentially react with the major constituents or products to prevent the desired condensation, that, in general, it be a base of sufficient strength to form a salt with acetic acid.

The new catalysts are preferably anhydrous, although a small amount of moisture does not seriously affect the condensation. It has been found that the use of these basic materials may result to a slight extent in the closure of the 6-membered pyrimidine-type ring to yield some 4-aminouracil. However, this does not in any way detract from the value of the novel process, since the ring closure is an essential step anyway in the synthesis of xanthine or methylated xanthines like theophylline and caffeine. The cyanoacetylurea product of this catalyzed condensation may be isolated as such, but this is not necessary in the ultimate synthesis. Rather, the closure of the 6-membered ring may be completed by simple dilution of the reaction mixture with water and addition of alkali. A further step in the overall process for the preparation of xanthines may thus be carried out without the usual isolation of interim products; i. e. nitrosated intermediates may be formed directly. When theophylline or caffeine is the end product of the series of reactions, such an intermediate is 1,3-dimethyl-4-amino-5-nitrosouracil. This nitroso compound may be isolated and subjected to further conventional procedures to complete the xanthine synthesis.

The improvement in yield of cyanoacetylureas, brought about by the use of these basic materials as catalysts, amounts generally to about 20%. The quality of the products obtained is excellent and, as previously indicated, they need not be isolated as such but may be simply carried through further steps in the ultimate synthesis. For instance, yields of approximately 80 to 85% of 1,3-dimethyl-4-amino-5-nitrosouracil (based on the cyanoacetic acid and dimethylurea initially used) are obtained by means of this process.

In carrying out the new condensation reaction according to preferred procedures, a urea compound (i. e. urea itself or a methylated urea) is mixed with cyanoacetic acid and acetic anhydride. Approximately equi-molecular weights of the first two reactants are used together with about one mole or a slight excess of acetic anhydride. For instance, if one mole of dimethylurea and one mole of cyanoacetic acid are used, it is convenient to use about 105 to 125 ml. of acetic anhydride. On stirring such a mixture, the temperature drops from that of the room to about 10° C. The addition of the basic catalyst then causes an immediate rise in temperature. It is preferable to maintain the reaction mixture at about 55°–75° C. for a period of approximately one to three hours. Under such operating conditions a time appreciably shorter than one hour tends to prevent completion of the reaction, and there is no great advantage in maintaining the reaction mixture at an elevated temperature for much more than three hours. As has been pointed out above, the amount of basic material required to accelerate the reaction and improve the yield of the cyanoacetylurea product need not be great, conventional catalytic proportions being generally enough. For instance, the use of 20 ml. of pyridine has been found quite satisfactory when equimolar quantities of the urea compound and cyanoacetic acid are condensed. A somewhat lower proportion of pyridine may be used, but the use of a much higher proportion serves no good purpose. When calcium oxide is the catalyst, a few grams per mole of the reactants is quite satisfactory. The catalytic basic material may be added all at once at the beginning of the reaction if desired, but it is often better to add it as several small portions over a period of one-half to one hour, which method allows the reaction to proceed more smoothly and with a less abrupt rise in temperature.

As noted above, it is not necessary to isolate the product cyanoacetylurea or methylated cyanoacetylurea. Instead, the reaction mixture may be diluted with water and sufficient alkali added to give at least a moderately basic pH. Ring closure then takes place at about room temperature or slightly higher. The reaction is quite rapid and is generally completed in less than one-half hour. The mass may then be acidified by means of a weak acid, such as glacial acetic acid. Addition of a nitrite, preferably an alkali metal nitrite according to known methods, and maintenance of the reaction mixture at an elevated temperature for another hour or so will result in the formation of the corresponding 5-nitroso compound. This material, having a low solubility in water, separates as a bright red, crystalline compound. It may be filtered, washed and dried or the moist filtercake may be used for further reactions. The quality and yield of the cyanoacetylurea product condensed by this new catalysis method is such that the subsequent ring closure and nitrosation are very favorably affected as to yield, speed of reaction, quality, etc.

The following examples are given by way of illustration and are not to be considered as the only manner in which this invention may be embodied. It is to be understood that protection hereof is only to be limited by the specific wording of the appended claims.

*Example I*

Dimethylurea (88 grams) and 85 grams of cyanoacetic acid were mixed with 110 ml. of acetic anhydride. The mixture was stirred until the solids were completely dissolved. During dissolution the temperature dropped to about 10° C. To the agitated mixture were added 20 ml. of pyridine. The temperature began to rise immediately and, when 40° C. was reached, cooling water was applied to the outside of the flask. The temperature of the mixture was allowed to rise gradually to 60° C. and was maintained there for one hour until the desired condensation was completed. The mixture was stirred and cooled while 500 ml. of water were introduced. A solution of 132 grams of sodium hydroxide and 500 ml. of water was then added over a period of 20 to 30 minutes, the temperature of the mixture being maintained at 30–35° C. throughout. A slurry of the amino uracil was thus formed. At the same temperature 120 ml. of glacial acetic acid were commingled therewith and the mix heated at 40° C. A solution of 70 grams of sodium nitrite in 150 ml. of water was subsequently added over a period of one-half hour, while the temperature was held at 45°–50° C. After stirring for one hour at the same temperature, the reaction mixture was allowed to stand at room temperature overnight. The resulting bright red, crystalline precipitate was filtered, washed with a small volume of water and dried at 60° C. The product, 1,3-dimethyl-4-amino-5-nitrosouracil, weighed 162.6 grams. This represented 80.5% of the theoretical yield.

The above process was repeated twice with similar successful results, substituting for the pyridine in one case potassium acetate and in the other case triethylamine.

*Example II*

Dimethylurea (176 grams) and cyanoacetic acid (170 grams) were dissolved in 236 grams of acetic anhydride. The mixture was heated to 25° C. and, while being stirred, 7.0 grams of anhydrous calcium oxide were added in four equal portions over a period of one hour. During the addition the temperature was maintained at about 60° C. by cooling the outside of the flask and thereafter the mixture was kept at 65°–70° C. for one more hour while condensation proceeded. It was then diluted with 525 ml. of water and a solution of 188.6 grams of sodium hydroxide in 710 ml. of water was added over a period of 30 minutes. The mixture was stirred rapidly throughout the addition and its temperature was held at 30°–35° C. The pH at this point was about 9.0 to 9.5. The suspension of solid became quite thick during the addition of the sodium hydroxide. The temperature of the mixture was finally raised to 50° C. and 600 ml. of water were added. Its pH was then lowered to about 6 to 6.5 with the addition of approximately 15 ml. of 10% sulfuric acid, after which 134 ml. of glacial acetic acid were introduced, followed by a solution of 127 grams of sodium nitrite in 260 ml. of water (added over a period of one hour). The mixture was maintained at about 50° C. during this time, stirred for one hour at 50° C. and then allowed to stand at room temperature overnight. The nitroso compound was filtered, washed with water and dried at atmospheric pressure and at 60° C. The product prepared in this manner weighed about 343 grams (85% of the theoretical amount). Its melting point and analysis corresponded very closely to that of pure 1,3-dimethyl-4-amino-5-nitrosouracil.

When the condensation step alone was repeated, using urea itself in place of its methylated derivative, a notably high yield of cyanoacetylurea was recovered.

*Example III*

A mixture of 333 grams of dimethylurea, 323 grams of cyanoacetic acid and 450 grams of acetic anhydride was prepared. The mixture was stirred until the solids were completely dissolved and 13.25 grams of anhydrous calcium oxide were added over a period of approximately one-half hour. The temperature was allowed to rise and held at about 70° C. for one hour. The mixture was then cooled rapidly to less than 25° C. and a solution of 50% caustic soda was added until a pH of near 12 was reached, about 700 grams of the caustic being necessary. During the addition ice (about 1500 grams) was added to the reaction mixture to maintain the temperature at below 25° C. At the basic pH 1,3-dimethyl-4-aminouracil crystallized out to form a heavy cream-colored slurry. This was neutralized to about pH6 with glacial acetic acid. Then 240 grams of sodium nitrite and 266 grams of glacial acetic acid were added in small increments, while the mixture was heated to 65° C. and maintained there throughout the addition. The mass was then cooled to 25° C. and sufficient water was added to assure the complete dissolution of sodium acetate present in the reaction mixture. The nitrosated product was then filtered, washed with water and sucked as dry as possible for use in further steps of the xanthine synthesis.

What is claimed is:

1. A process for the preparation of a xanthine intermediate which comprises condensing cyanoacetic acid with a urea compound in an acetic anhydride medium in the presence of an alkaline condensation catalyst.

2. The process of claim 1 wherein the catalyst is chosen from the group consisting of tertiary amines, cyclic organic bases, salts of a weak acid and a strong base, and oxides of alkaline earth metals.

3. The process of claim 1 wherein the catalyst is pyridine.

4. The process of claim 1 wherein the catalyst is calicum oxide.

5. A process for the preparation of a xanthine intermediate which comprises commingling cyanoacetic acid, a urea compound, acetic anhydride and an alkaline reacting, anhydrous condensation catalyst and maintaining the reaction mixture at a temperature of about 55°–75° C. for substantially from one to three hours.

6. The process of claim 5 wherein the urea compound is N,N′-dimethylurea and the catalyst is calcium oxide.

7. In a process for preparing 1,3-dimethyl-4-amino-5-nitrosouracil, the improvement which comprises commingling at elevated temperatures approximately equimolar proportions of dimethylurea and cyanoacetic acid in acetic anhydride containing a minor proportion of an alkaline condensation catalyst.

References Cited in the file of this patent

UNITED STATES PATENTS

| | | |
|---|---|---|
| 2,523,496 | Campbell et al. | Sept. 26, 1950 |
| 2,553,022 | Wallingford et al. | May 15, 1951 |